United States Patent [19]
Aoki

[11] Patent Number: 6,166,889
[45] Date of Patent: Dec. 26, 2000

[54] FLOPPY DISK DEVICE

[75] Inventor: Takabumi Aoki, Tokyo, Japan

[73] Assignee: NEC Corporation, Tokyo, Japan

[21] Appl. No.: 09/081,610

[22] Filed: May 20, 1998

[30] Foreign Application Priority Data

May 21, 1997 [JP] Japan ................................. 9-130688

[51] Int. Cl.[7] ................................................ G11B 21/02
[52] U.S. Cl. ............................................... 360/267.7
[58] Field of Search ................................. 360/106, 109, 360/267.3, 267.4, 267.5, 267.6, 267.7, 267.8; 369/75.1, 215, 219, 223, 244, 249; 310/49 R, 67 R; 74/89.14, 89.15

[56] References Cited

U.S. PATENT DOCUMENTS

| | | | |
|---|---|---|---|
| 4,539,611 | 9/1985 | Sidhu et al. | 360/99.04 |
| 4,700,251 | 10/1987 | Fuke et al. | 360/106 |
| 4,751,411 | 6/1988 | Fukaya et al. | 310/49 R |
| 5,175,723 | 12/1992 | Guha | 369/215 |
| 5,633,849 | 5/1997 | Konno et al. | 369/75.1 |

FOREIGN PATENT DOCUMENTS

| | | | |
|---|---|---|---|
| 59-162668 | 9/1984 | Japan | 369/219 |
| 6-21383 | 3/1994 | Japan . | |
| 6-133490 | 5/1994 | Japan . | |

*Primary Examiner*—David L. Ometz
*Attorney, Agent, or Firm*—McGinn & Gibb, P.C.

[57] ABSTRACT

To provide a floppy disk device wherein positioning members of the PM type stepper motor are unitized with the base frame (3), the base frame comprises a housing fabricated in the same body of the same material with the base frame (3) wherein a coil assembly (13, 14) of the PM type stepper motor is fixed, and frame stator-teeth (3c) configured by punching out parts of the housing. An inner housing cap (21) having inner-housing-cap stator-teeth (21a) is put inside the housing for covering the coil assembly (13, 14). To an opening of the housing, a first pivot bearing (2') retained by a plate spring (22) is inserted. To an opening of a frame pivot-fixed face (3a) fabricated by punching out a part of the base frame (3), a second pivot bearing (2) is fixed. A lead-screw shaft (1) is set between the first and the second pivot bearing (2'and 2) compressing the plate spring (22).

18 Claims, 6 Drawing Sheets

FLOPPY DISK DEVICE

BACKGROUND OF THE INVENTION

The present invention relates to a floppy disk device, and particularly to a floppy disk device assembly whereof accuracy and strength are improved and the number of parts is reduced.

A conventional example of the floppy disk device assembly will be described referring to FIGS. 7 to 12.

FIG. 7 is a perspective view illustrating an example of the conventional floppy disk device. The floppy disk device is an apparatus for recording data into or reading data from a floppy disk, namely, a diskette of a magnetic recording medium. The floppy disk is installed detachably into the floppy disk device and rotated by a spindle motor of the floppy disk device. A head carriage is driven by a stepper motor on the surface of the floppy disk for positioning a magnetic head which records data into or reads data from the floppy disk.

FIG. 8 is a perspective view wherein are illustrated only the stepper motor, a PM (Pulse Motor) type stepper motor, in this example, and parts supporting the PM type stepper motor of the floppy disk device of FIG. 7.

Referring to FIG. 8, the PM type stepper motor comprises a lead-screw shaft 1, a shaft bearing 4, a housing 5 and driving mechanism provided in the housing 5. At the tip of the lead-screw shaft 1, a pivot bearing 2 is provided for supporting the lead-screw shaft 1.

FIG. 9 is a plane view illustrating an upper side of FIG. 8. The PM type stepper motor is fixed to a base frame 3 with two screws 6, as shown in FIG. 9.

FIG. 10 is a partial magnification of FIG. 9 illustrating the PM type stepper motor and its supporting parts. The pivot bearing 2 is inserted into an opening of a frame pivot-fixture face 3a of the base frame 3 whereto a head carriage seek mechanism is to be installed.

FIG. 11 is a cross section illustrating sections of parts of FIG. 10 cut by a plane including the center axis of the lead-screw shaft 1, and FIG. 12 is a cross section wherein the parts of FIG. 11 are disassembled.

Referring to FIGS. 11 and 12, in a frame motor-fixture face 3b of the base frame 3, there is provided an opening which makes a clearance fit with the external diameter of the shaft bearing 4. Through the opening, the PM type stepper motor is inserted from the tip of the lead-screw shaft 1 so that the tip of the lead-screw shaft 1 fits to pivot bearing 2 by way of a steel ball 12 inserted between them. The shaft bearing 4 is also inserted into the opening until a normal position where the flange of the housing 5 fits to the frame motor-fixture face 3b. The PM type stepper motor is fixed to the frame motor-fixture face 3b at the normal position by screwing the two screws 6 into two screw holes each provided symmetrically and diagonally with each other to the opening so as to tighten the flange of the housing 5 onto the frame motor-fixture face 3b.

In the housing 5 made of magnetic material, there are provided a plate spring 16 for receiving the bottom surface of the lead-screw shaft 1, and a coil assembly consisting of coils 13 and a stator yoke 14. The coil assembly is put into the housing 5 so that each stator of the stator yoke 14 is positioned being separated with a predetermined phase angle from each tooth of housing stator-teeth 5a, which are configured by punching out the magnetic material of the housing 5, for example. The lead-screw shaft 1 whereon a permanent magnet 11 is configured is inserted inside the coil assembly (the coils 13 and the stator yoke 14) and the housing stator-teeth 5a, and then a housing cap 15 made of magnetic material having housing cap stator teeth 15a is put inside of the housing 5. The shaft bearing 4 fixed to the housing cap 15 retains the lead-screw shaft 1 which is inserted through the shaft bearing 4 and pushed to the plate spring 16.

Thus, the PM type stepper motor is assembled and fixed to the base frame 3.

As above described, the PM type stepper motor is fixed to the base frame 3 with the two screws 6, in the conventional floppy disk device. This means that the two components for positioning the lead-screw shaft 1, namely, the pivot bearing 2 and the shaft bearing 4 are each fixed to each different member. Therefore, the axis of the shaft bearing 4 may be shifted form that of the pivot bearing 2 by the error of assembling, that is to say, the correct coaxiality of the lead-screw shaft 1, and accordingly, the correct concentricity of the rotor and the stator of the PM type stepper motor may not be obtained, resulting in variation of the distance between the rotor and the stator.

Therefore, there is a problem that the seeking accuracy of the head carriage may be easily affected by a poor coaxiality of the lead-screw shaft 1, in the conventional floppy disk device.

Another problem of the conventional floppy disk device is that the positioning of the PM type stepper motor may be easily shifted with an unexpected sock or a change of atmosphere such as temperature or humidity, because of the same reason that the PM type stepper motor and the base frame as fabricated separately and fixed together with the two screws 6.

Still another problem is that there are needed many parts, and accordingly, many assembling processes accompanied by a high assembling cost and a high part cost, because the PM type stepper motor and the base frame are fabricated separately.

SUMMARY OF THE INVENTION

Therefore, a primary object of the present invention is to provide a floppy disk device wherein positioning members of the PM type stepper motor are unitized with the base frame of the floppy disk device for resolving above problems.

In order to achieve the object, the base frame of a floppy disk device according to a first embodiment comprises:

a housing fabricated in the same body of the same material with the base frame, a coil assembly of the PM type stepper motor being fixed in said housing; and frame stator-teeth configured by punching out parts of the housing, said frame stator-teeth functioning as a part of a magnetic circuit of the PM type stepper motor in combination with a side of a stator yoke included in the coil assembly.

An inner housing cap is preferably put inside the housing for covering the coil assembly form an end of the coil assembly, the other end of the coil assembly being faced to a bottom of the housing.

The inner housing cap preferably comprises inner-housing-cap stator-teeth functioning as a part of the magnetic circuit in combination with the other side of the stator yoke.

The housing preferably has an opening whereto a first pivot bearing is inserted for supporting an end of a shaft of the PM type stepper motor, said first pivot bearing being retained by a plate spring flexibly to the housing.

The base frame preferably comprises a frame pivot=fixture face fabricated by punching out a part of the base frame, said frame pivot-fixture face having an opening whereto a second pivot bearing is fixed for supporting the other end of the shaft.

The base frame of a floppy disk device according to a second embodiment comprises:

an inner housing fabricated in the same body of the same material with the base frame, a coil assembly of the PM type stepper motor being fixed in said inner housing; and frame stator-teeth configured by punching out parts of the inner housing, said frame stator-teeth functioning as a part of a magnetic circuit of the PM type stepper motor in combination with a side of a stator yoke included in the coil assembly.

An outer housing cap is preferably put outside the inner housing for covering the coil assembly form an end of the coil assembly, the other end of the coil assembly being faced to a base of the inner housing.

The outer housing cap preferably comprises outer-housing-cap stator-teeth functioning as a part of the magnetic circuit in combination with the other side of the stator yoke.

The outer hosing cap is preferably provided with a plate spring for receiving an end of a shaft of the PM type stepper motor.

The base frame preferably comprises a frame pivot-fixture face fabricated by punching out a part of the base frame, said frame pivot-fixture face having an opening whereto a pivot bearing is fixed for supporting the other end of the shaft.

A shaft bearing is preferably provided being fixed to the inner housing for supporting the shaft.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
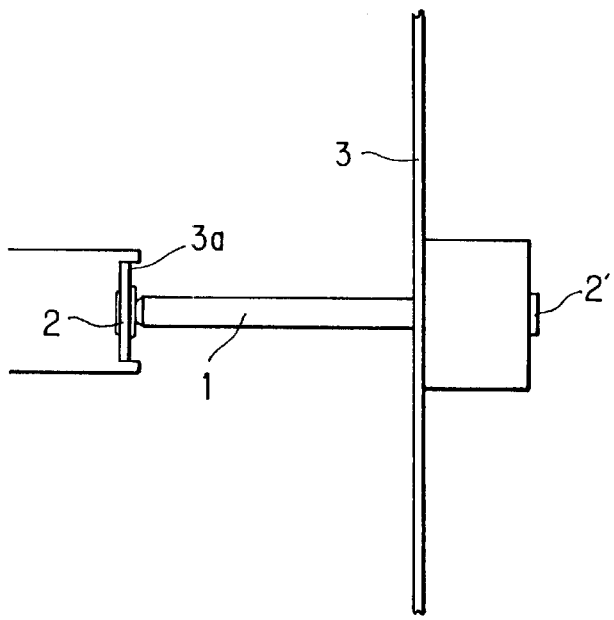
FIG. 1 is a plan view illustrating a PM type stepper motor and its peripheral parts of a floppy disk device according to a first embodiment of the invention.
Figure 2:
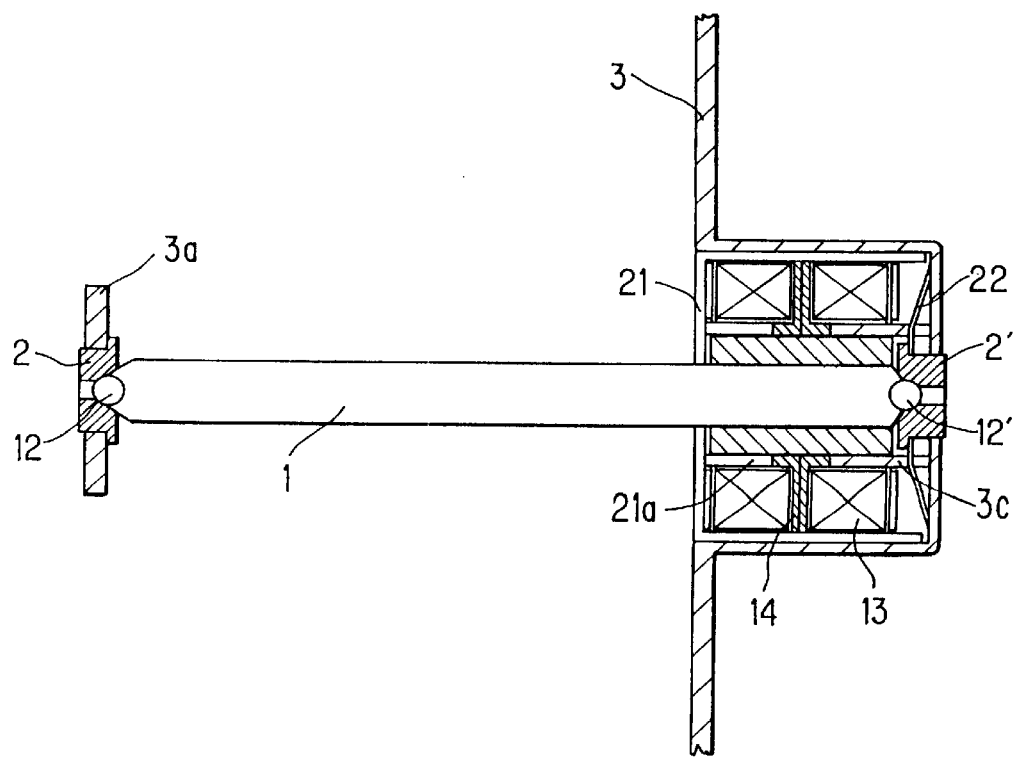
FIG. 2 is a cross section illustrating sections of parts of FIG. 1.
Figure 3:
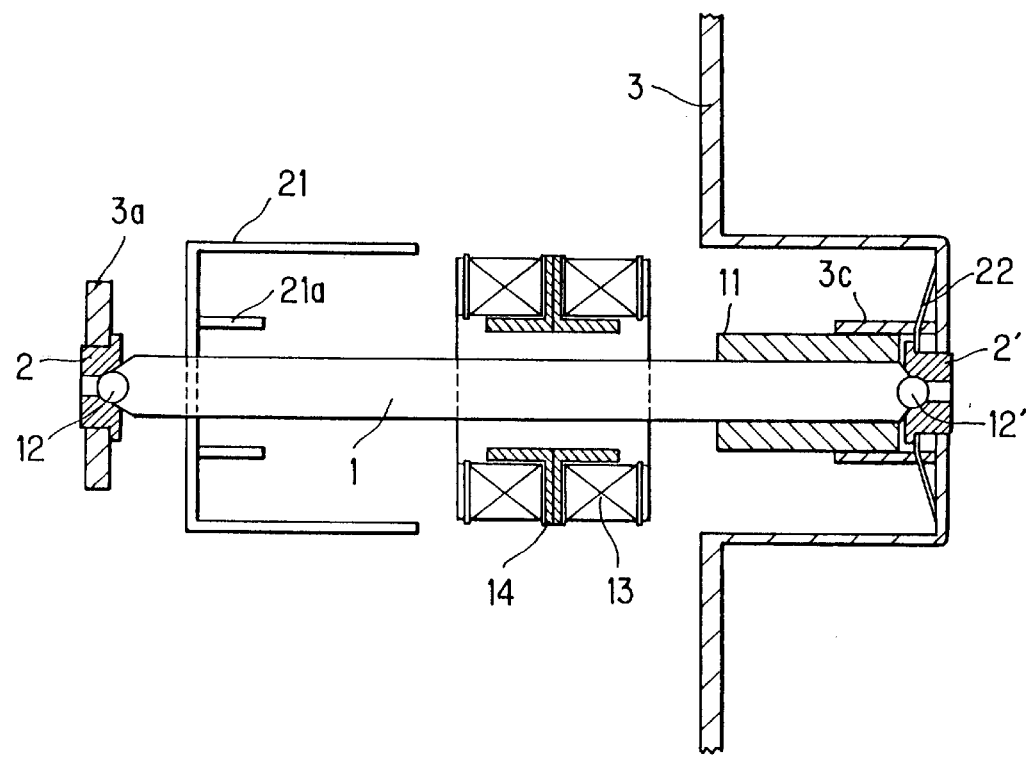
FIG. 3 is a cross section wherein the parts of FIG. 2 are disassembled.

A first embodiment of the invention is described for the first, referring to FIGS. 1 to 3.

FIG. 1 is a plane view illustrating a PM type stepper motor for driving seek mechanism of a head carriage and peripheral parts of the PM type stepper motor of a floppy disk device according to the first embodiment.

Figure 10:
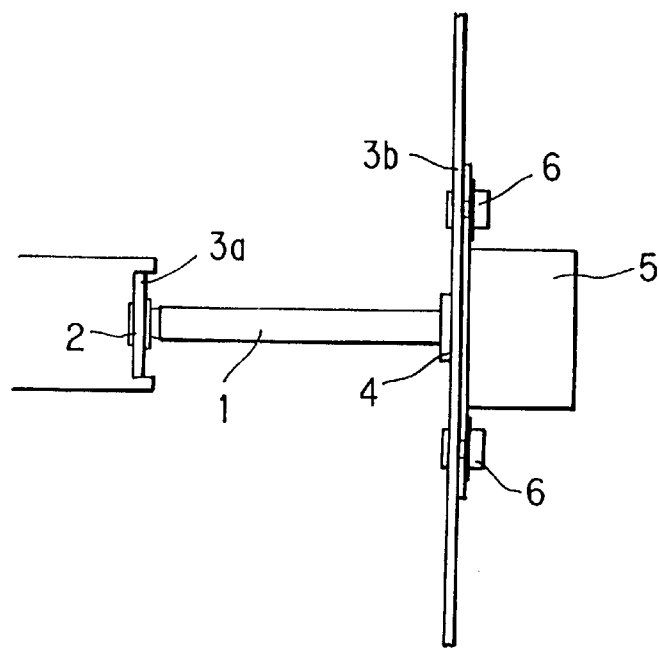
FIG. 10 is a partial magnification of FIG. 9 illustrating the PM type stepper motor and its supporting parts.

In FIG. 1, a base frame 3, a first and a second pivot bearing 2' and 2, a frame-pivot fixture face 3a and a lead-screw shaft 1 are seen. However, it is noted that there is provided no shaft bearing or screws in the floppy disk device assembly of FIG. 1, compared to the conventional floppy disk assembly of FIG. 10.

FIG. 2 is a cross section illustrating sections of parts of FIG. 1 cut by a plane including the center axis of the lead-screw shaft 1.

As can be seen in FIG. 2, the base frame 3 is so configured as to form a housing of the PM type stepper motor as a part of the base frame 3. In other words, the housing is configured in the same body with the base frame 3.

The base frame 3 and the housing is made of magnetic material and frame stator-teeth 3c are formed by punching out bottom parts of the housing with a press working, for example.

Thus, the base frame 3, the housing (hereafter called the frame housing), and the frame stator-teeth 3c are fabricated in a single body, according to the embodiment.

In the center part of the frame housing bottom of the base frame 3, there is provided an opening whereto a first pivot bearing 2' is inserted. The first pivot bearing 2' is also retained by a plate spring 22 to the frame housing bottom.

Figure 11:
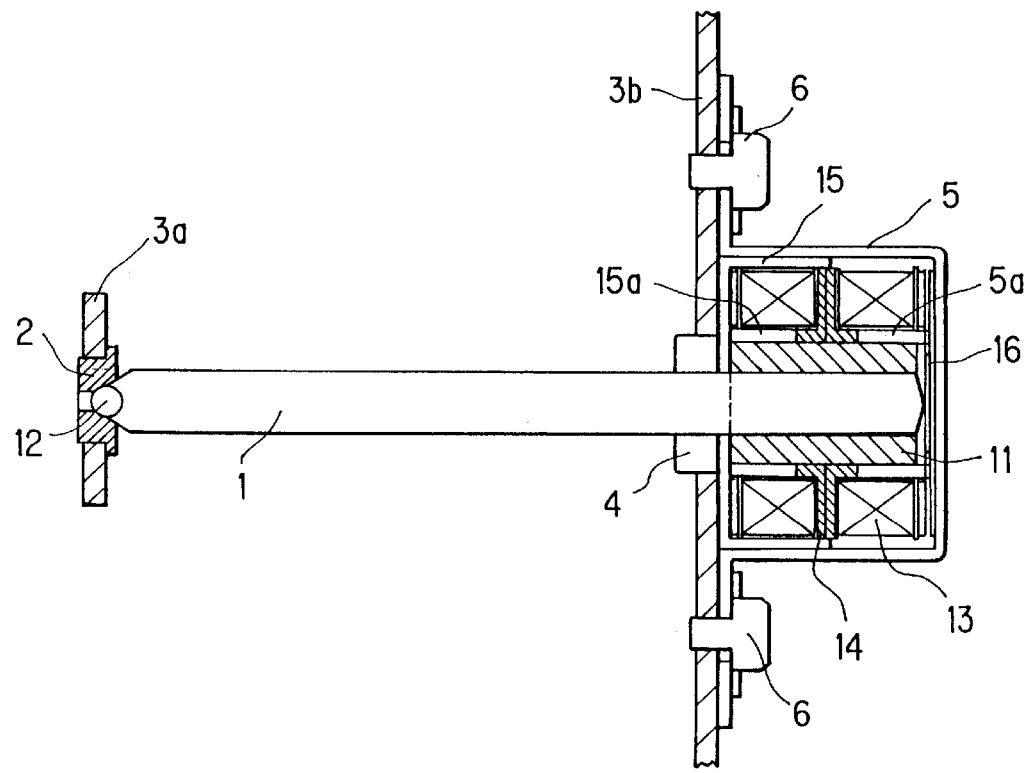
FIG. 11 is a cross section illustrating sections of parts of FIG. 10.
Figure 12:
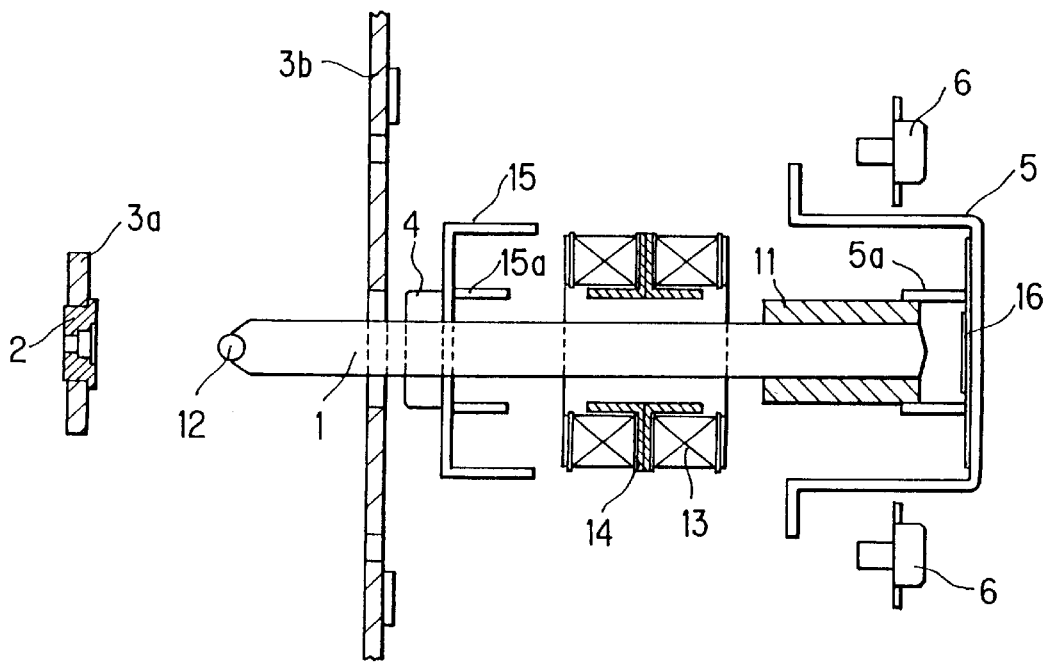
FIG. 12 is a cross section wherein the parts of FIG. 11 are disassembled.

A second pivot bearing 2 is fixed to a frame-pivot fixture face 3a of the base frame 3, in the same way with the conventional floppy disk assembly of FIG. 11.

FIG. 3 is a cross section wherein the parts of FIG. 2 are disassembled.

As can be understood form FIG. 3, steel balls 12 and 12' are set in two hollows provided at both tips of the lead-screw shaft 1. A permanent magnet 11 is configured at a housing-side end of the lead-screw shaft 1. An inner housing cap 21 and a coil assembly consisting of coils 13 and a stator yoke 14 are put through the lead-screw shaft 1.

The lead-screw shaft 1 is inserted into the frame housing from the housing-side end having the permanent magnet 11 so that the steel ball 12' set at the housing-side tip of the lead-screw shaft 1 fits to the first pivot bearing 2'.

The lead-screw shaft 1 is pushed together with the first pivot bearing 2' towards the bottom of the frame housing, compressing the plate spring 22, in order to fit the steel ball 12 of the other tip of the lead-screw shaft 1 to the second pivot bearing 2 fixed to the frame pivot-fixture face 3a.

Thus, the lead-screw shaft 1 is set between the first and the second pivot bearing 2' and 2 both fixed to the base frame 3.

The inner housing cap 21 is also made of magnetic material and provided with inner-housing-cap stator-teeth 21a configured by punching out parts of the cap top of the inner housing cap 21.

The coil assembly is so put into the inner housing cap 21 that each stator of the stator yoke 14 is positioned being separated with a predetermined phase angle from each tooth of the inner-housing-cap stator-teeth 21a.

Then, the inner housing cap 21 assembled with the coil assembly is so put into the frame housing that each stator of the stator yoke 14 is positioned being separated with a predetermined phase angel also from each tooth of the frame stator-teeth 3c.

Thus, the parts of the PM type stepper motor are fabricated and assembled in the first embodiment.

Therefore, the coaxiality of the lead-screw shaft 1 is always ensured with the first and the second pivot bearing 2' and 2 which are both fixed to the single member, that is, the base frame 3. Positioning of the coil 13, the stator yoke 14, the inner housing cap 21, the inner-housing-cap stator-teeth 21a, the frame stator-teeth 3c and the frame housing as a part of the base frame 3, which compose a magnetic circuit of the PM type stepper motor, is defined also by the base frame 3.

Now, a second embodiment of the invention will be described referring to FIGS. 4 to 6.

Figure 4:
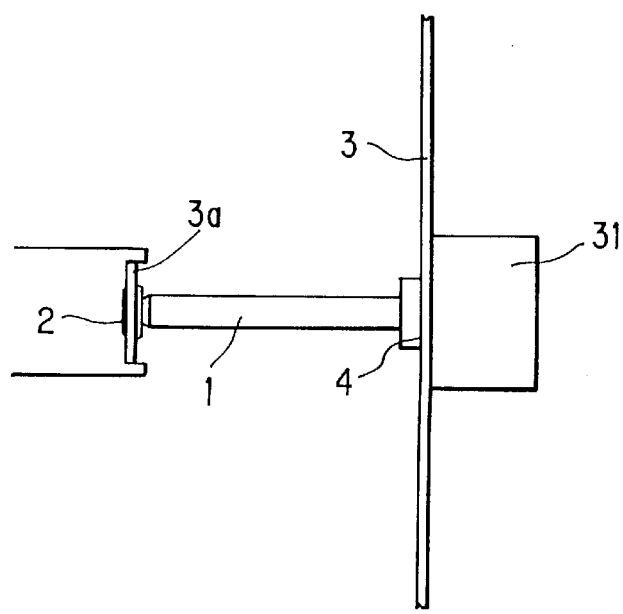
FIG. 4 is a plane view illustrating a PM type stepper motor and its peripheral parts of a floppy disk device according to a second embodiment of the invention.

FIG. 4 is a plane view illustrating a PM type stepper motor for driving seek mechanism of a head carriage and peripheral parts of the PM type stepper motor of a floppy disk device according to the second embodiment, wherein a shaft bearing 4 is provided instead of the first pivot bearing 2', compared to the first embodiment of FIG. 1.

Figure 5:
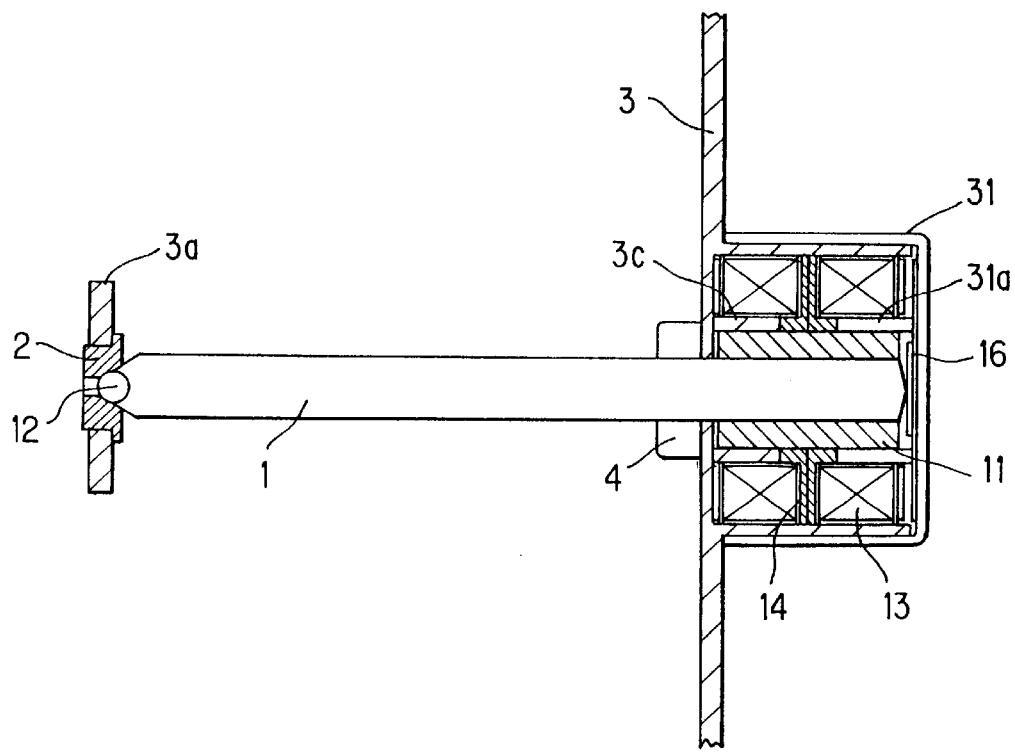
FIG. 5 is a cross section illustrating sections of parts of FIG. 4.

FIG. 5 is a cross section illustrating sections of parts of FIG. 4 cut by a plane including the center axis of the lead-screw shaft 1.

As can be seen in FIG. 5, the base frame 3 is so configured as to form an inner housing of the PM type stepper motor as a part of the base frame 3, in the second embodiment, instead of the frame housing of the first embodiment.

The base frame 3 and the inner housing is made of magnetic material and frame stator-teeth 3c are formed by punching out parts of a base face of the inner housing with a press working, for example.

Thus, the base frame 3, the inner housing, and the frame stator-teeth 3c are fabricated in a single body, according to the second embodiment.

In the center part of the base face of the inner housing, there is provided an opening whereto a shaft bearing 4 is fixed.

Through the shaft bearing 4, a lead-screw shaft 1 is inserted from its tip, until a steel ball 12 set in a hollow of the tip is fit to a pivot bearing 2 fixed in an opening of a frame pivot-fixture face 3a. At the root of the lead-screw shaft 1, a permanent magnet 11 is configured.

Figure 6:
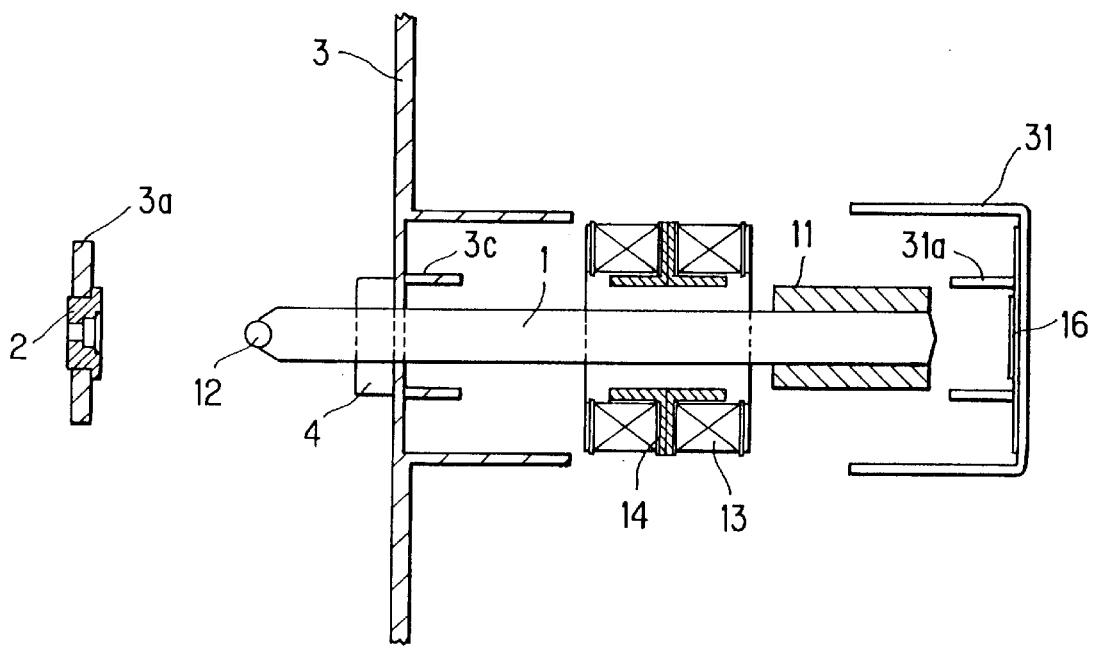
FIG. 6 is a cross section wherein the parts of FIG. 5 are disassembled.
Figure 7:
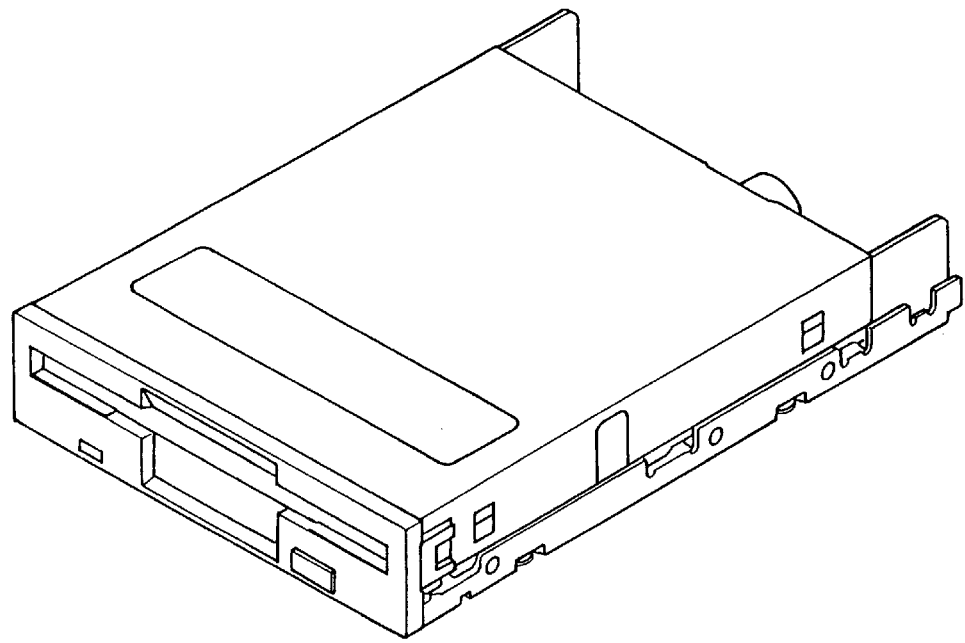
FIG. 7 is a perspective view illustrating an example of a conventional floppy disk device.
Figure 8:
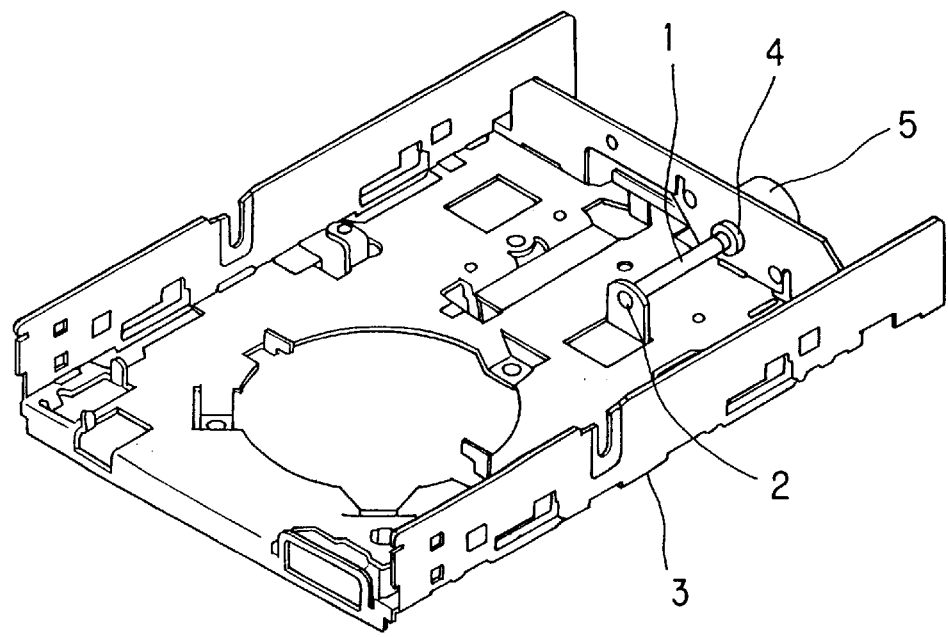
FIG. 8 is a perspective view wherein are illustrated only the PM type stepper motor and parts supporting the PM type stepper motor of the floppy disk device of FIG. 7.
Figure 9:
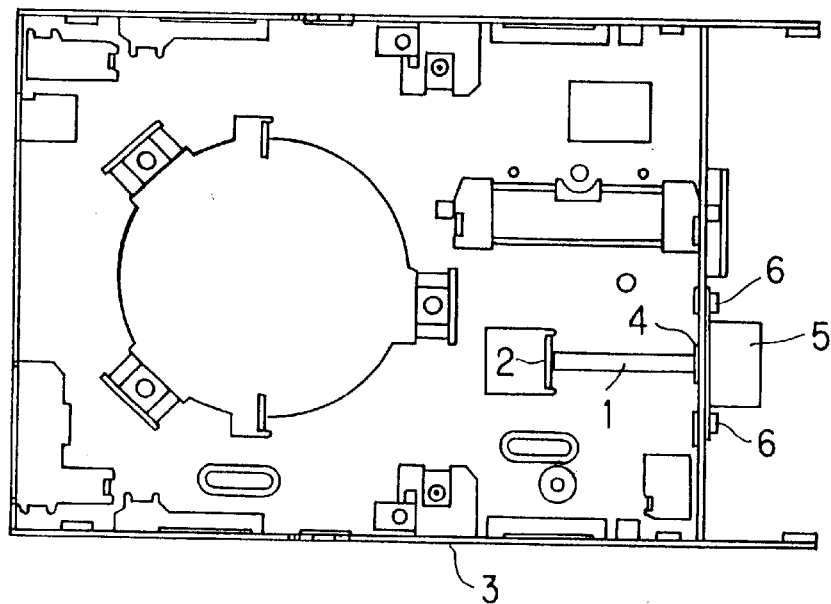
FIG. 9 is a plane view illustrating upper side of FIG. 8.

FIG. 6 is a cross section wherein the parts of FIG. 5 are disassembled.

Referring to FIG. 6, a coil assembly consisting of coils 13 and a stator yoke 14 are so put into the inner housing that each stator of the stator yoke 14 is positioned being separated with a predetermined phase angle from each tooth of the frame stator-teeth 3c.

In the second embodiment, there is provided an outer housing cap 31 made of magnetic material, wherein outer-housing-cap stator-teeth 31a are configured by punching out parts of the bottom face of the outer housing cap 31. Inside the bottom face of the outer housing cap 31, a plate spring 16 is provided for receiving the root end of the lead-screw shaft 1. The outer housing cap 31 is so put over the inner housing that each tooth of the outer-housing-cap stator-teeth 31a is positioned being separated with a predetermined phase angle from each stator of the stator yoke 14.

Thus, the parts of the PM type stepper motor are fabricated and assembled in the second embodiment.

Therefore, the coaxiality of the lead-screw shaft 1 is always ensured with the pivot bearing 2 and the shaft bearing 4 which are both fixed to the single member, that is, the base frame 3, in the second embodiment. Positioning of the coil 13, the stator yoke 14, the inner housing as a part of the base frame 3, the frame stator-teeth 3c, the outer-housing-cap stator-teeth 31a, and the outer housing cap 31, which compose a magnetic circuit of the PM type stepper motor, is defined also by the base frame 3.

As heretofore described, the coaxiality of the lead-screw shaft 1 and the positioning of members composing the magnetic circuit are both defined by the single base frame 3, in either the first or the second embodiment of the invention.

Therefore, by fabricating the base frame 3 precisely, the correct coaxiality of the lead-screw shaft 1, the correct concentricity of the coil assembly to the lead-screw shaft 1, and the symmetricity of the magnetic circuit can be easily obtained in the invention, ensuring a stable and precise seeking performance of the floppy disk device without no distance variation between the rotor and the stator and with a smooth excitation alteration of the PM type stepper motor.

Furthermore, by unitizing the frame stator-teeth 3c and the frame housing (in the first embodiment) or the inner housing (in the second embodiment) with the base frame 3, the problem that the positioning of the PM type stepper motor may be easily shifted with an unexpected shock or a change of atmosphere such as temperature or humidity can be eliminated according to the invention.

Still further, the number of parts, and accordingly, the number of assembling processes can be reduced in the invention also be unitizing the frame stator-teeth 3c and the frame housing (in the first embodiment) or the inner housing (in the second embodiment) with the base frame 3, reducing the parts' cost and the assembling cost as well.

What is claimed is:

1. A floppy disk device having a PM (Pulse Motor) stepper motor for driving a seek mechanism of the floppy disk device and a base frame for supporting the seek mechanism; said base frame comprising:

a housing fabricated in the same body of the same material with the base frame, a coil assembly of the PM stepper motor being fixed in said housing; and frame stator-teeth configured by punching out parts of the housing, said frame stator-teeth functioning as a part of a magnetic circuit of the PM stepper motor in combination with a side of a stator yoke included in the coil assembly.

2. A floppy disk device as recited in claim 1 comprising an inner housing cap which is put inside the housing for covering the coil assembly from an end of the coil assembly, the other end of the coil assembly being faced to a bottom of the housing.

3. A floppy disk device as recited in claim 2, said inner housing cap comprising inner-housing-cap stator-teeth functioning as a part of the magnetic circuit in combination with the other side of the stator yoke.

4. A floppy disk device as recited in claim 3, wherein the stator yoke and the inner-housing-cap stator-teeth are positioned being separated with a predetermined phase angle from each other.

5. A floppy disk device as recited in claim 1, said housing having an opening whereto a first pivot bearing is inserted for supporting an end of a shaft of the PM stepper motor, said first pivot bearing being retained by a plate spring flexibly to the housing.

6. A floppy disk device as recited in claim 5, said base frame comprising a frame pivot-fixture face fabricated by punching out a part of the base frame, said frame pivot-fixture face having an opening whereto a second pivot bearing is fixed for supporting the other end of the shaft.

7. A floppy disk device as recited in claim 6, wherein a steel ball is provided at each tip of the shaft for fitting to respective each of the first and the second pivot bearing.

8. A floppy disk device as recited in claim 5, wherein no shaft bearing is needed for supporting the shaft.

9. A floppy disk device as recited in claim 1, wherein the stator yoke and the frame stator-teeth are positioned being separated with a predetermined phase angle from each other.

10. A floppy disk device having a PM stepper motor for driving a seek mechanism of the floppy disk device and a base frame for supporting the seek mechanism; said base frame comprising:

an inner housing fabricated in the same body of the same material with the base frame, a coil assembly of the PM stepper motor being fixed in said inner housing; and frame stator-teeth configured by punching out parts of the inner housing, said frame stator-teeth functioning as a part of a magnetic circuit of the PM stepper motor in combination with a side of a stator yoke included in the coil assembly.

11. A floppy disk device as recited in claim 10 comprising an outer housing cap which is put outside the inner housing for covering the coil assembly from an end of the coil assembly, the other end of the coil assembly being faced to a base of the inner housing.

12. A floppy disk device as recited in claim 11, said outer housing cap comprising outer-housing-cap stator-teeth functioning as a part of the magnetic circuit in combination with the other side of the stator yoke.

13. A floppy disk device as recited in claim 12, wherein the stator yoke and the outer-housing-cap stator-teeth are positioned being separated with a predetermined phase angle from each other.

14. A floppy disk device as recited in claim 11, said outer housing cap being provided with a plate spring for receiving an end of a shaft of the PM stepper motor.

15. A floppy disk device as recited in claim 14, said base frame comprising a frame pivot-fixture face fabricated by punching out a part of the base frame, said frame pivot-fixture face having an opening whereto a pivot bearing is fixed for supporting the other end of the shaft.

16. A floppy disk device as recited in claim 15, wherein a steel ball is provided at a tip of the shaft for fitting to the pivot bearing.

17. A floppy disk device a recited as recited in claim 14, wherein a shaft bearing is provided being fixed to the inner housing for supporting the shaft.

18. A floppy disk device as recited in claim 10, wherein the stator yoke and the frame and the frame stator-teeth are positioned being separated with a predetermined phase angle from each other.

* * * * *

UNITED STATES PATENT AND TRADEMARK OFFICE
CERTIFICATE OF CORRECTION

PATENT NO. : 6,166,889
DATED : December 26, 2000
INVENTOR(S) : Takabumi Aoki

It is certified that error appears in the above-identified patent and that said Letters Patent are hereby corrected as shown below:

ON THE TITLE PAGE

Please change the residence of the inventor to --[75] Gunma, Japan--.

Signed and Sealed this

Eighth Day of May, 2001

*Attest:*

NICHOLAS P. GODICI

*Attesting Officer*     *Acting Director of the United States Patent and Trademark Office*